(12) United States Patent
Hamilton et al.

(10) Patent No.: US 8,953,269 B1
(45) Date of Patent: Feb. 10, 2015

(54) MANAGEMENT OF DATA OBJECTS IN A DATA OBJECT ZONE

(71) Applicant: Western Digital Technologies, Inc., Irvine, CA (US)

(72) Inventors: David M. Hamilton, Trabuco Canyon, CA (US); Raymond Yu, Westminster, CA (US); Srinivas Neppalli, Irvine, CA (US); David C. Pruett, Longmont, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/335,539

(22) Filed: Jul. 18, 2014

(51) Int. Cl.
*G11B 5/09* (2006.01)

(52) U.S. Cl.
USPC .......................................................... 360/48

(58) Field of Classification Search
USPC ............ 360/48, 49, 54, 39, 40; 386/241, 248, 386/332
See application file for complete search history.

(56) References Cited

U.S. PATENT DOCUMENTS

| | | | |
|---|---|---|---|
| 4,769,770 A | 9/1988 | Miyadera et al. | |
| 5,613,066 A | 3/1997 | Matsushima et al. | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,092,231 A | 7/2000 | Sze | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,202,121 B1 | 3/2001 | Walsh et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |

(Continued)

FOREIGN PATENT DOCUMENTS

WO 2009102425 A1 8/2009

OTHER PUBLICATIONS

David C. Pruett, et al., U.S. Appl. No. 12/895,855, filed Oct. 1, 2010, 27 pages.

(Continued)

*Primary Examiner* — Nabil Hindi

(57) ABSTRACT

Managing data objects in a Data Storage Device (DSD) including a disk and a volatile memory for storing data. A data object is written from the volatile memory in a data object zone of the disk of the DSD. At least one most recent version of a previously written data object is rewritten in the data object zone so that an earlier version of the data object written from the volatile memory does not interrupt a contiguous plurality of most recent versions of data objects stored in the data object zone.

26 Claims, 4 Drawing Sheets

(56) References Cited

U.S. PATENT DOCUMENTS

| | | | |
|---|---|---|---|
| 6,272,694 | B1 | 8/2001 | Weaver et al. |
| 6,278,568 | B1 | 8/2001 | Cloke et al. |
| 6,279,089 | B1 | 8/2001 | Schibilla et al. |
| 6,289,484 | B1 | 9/2001 | Rothberg et al. |
| 6,292,912 | B1 | 9/2001 | Cloke et al. |
| 6,310,740 | B1 | 10/2001 | Dunbar et al. |
| 6,317,850 | B1 | 11/2001 | Rothberg |
| 6,324,604 | B1 | 11/2001 | Don et al. |
| 6,327,106 | B1 | 12/2001 | Rothberg |
| 6,337,778 | B1 | 1/2002 | Gagne |
| 6,339,811 | B1 | 1/2002 | Gaertner et al. |
| 6,369,969 | B1 | 4/2002 | Christiansen et al. |
| 6,384,999 | B1 | 5/2002 | Schibilla |
| 6,388,833 | B1 | 5/2002 | Golowka et al. |
| 6,405,342 | B1 | 6/2002 | Lee |
| 6,408,357 | B1 | 6/2002 | Hanmann et al. |
| 6,408,406 | B1 | 6/2002 | Parris |
| 6,411,452 | B1 | 6/2002 | Cloke |
| 6,411,458 | B1 | 6/2002 | Billings et al. |
| 6,412,083 | B1 | 6/2002 | Rothberg et al. |
| 6,415,349 | B1 | 7/2002 | Hull et al. |
| 6,425,128 | B1 | 7/2002 | Krapf et al. |
| 6,441,981 | B1 | 8/2002 | Cloke et al. |
| 6,442,328 | B1 | 8/2002 | Elliott et al. |
| 6,445,524 | B1 | 9/2002 | Nazarian et al. |
| 6,449,767 | B1 | 9/2002 | Krapf et al. |
| 6,453,115 | B1 | 9/2002 | Boyle |
| 6,470,420 | B1 | 10/2002 | Hospodor |
| 6,480,020 | B1 | 11/2002 | Jung et al. |
| 6,480,349 | B1 | 11/2002 | Kim et al. |
| 6,480,932 | B1 | 11/2002 | Vallis et al. |
| 6,483,986 | B1 | 11/2002 | Krapf |
| 6,487,032 | B1 | 11/2002 | Cloke et al. |
| 6,490,635 | B1 | 12/2002 | Holmes |
| 6,493,173 | B1 | 12/2002 | Kim et al. |
| 6,499,083 | B1 | 12/2002 | Hamlin |
| 6,519,104 | B1 | 2/2003 | Cloke et al. |
| 6,525,892 | B1 | 2/2003 | Dunbar et al. |
| 6,545,830 | B1 | 4/2003 | Briggs et al. |
| 6,546,489 | B1 | 4/2003 | Frank, Jr. et al. |
| 6,550,021 | B1 | 4/2003 | Dalphy et al. |
| 6,552,880 | B1 | 4/2003 | Dunbar et al. |
| 6,553,457 | B1 | 4/2003 | Wilkins et al. |
| 6,574,774 | B1 | 6/2003 | Vasiliev |
| 6,578,106 | B1 | 6/2003 | Price |
| 6,580,573 | B1 | 6/2003 | Hull et al. |
| 6,594,183 | B1 | 7/2003 | Lofgren et al. |
| 6,600,620 | B1 | 7/2003 | Krounbi et al. |
| 6,601,137 | B1 | 7/2003 | Castro et al. |
| 6,603,622 | B1 | 8/2003 | Christiansen et al. |
| 6,603,625 | B1 | 8/2003 | Hospodor et al. |
| 6,604,220 | B1 | 8/2003 | Lee |
| 6,606,682 | B1 | 8/2003 | Dang et al. |
| 6,606,714 | B1 | 8/2003 | Thelin |
| 6,606,717 | B1 | 8/2003 | Yu et al. |
| 6,611,393 | B1 | 8/2003 | Nguyen et al. |
| 6,615,312 | B1 | 9/2003 | Hamlin et al. |
| 6,639,748 | B1 | 10/2003 | Christiansen et al. |
| 6,647,481 | B1 | 11/2003 | Luu et al. |
| 6,654,193 | B1 | 11/2003 | Thelin |
| 6,657,810 | B1 | 12/2003 | Kupferman |
| 6,661,591 | B1 | 12/2003 | Rothberg |
| 6,665,772 | B1 | 12/2003 | Hamlin |
| 6,687,073 | B1 | 2/2004 | Kupferman |
| 6,687,078 | B1 | 2/2004 | Kim |
| 6,687,850 | B1 | 2/2004 | Rothberg |
| 6,690,523 | B1 | 2/2004 | Nguyen et al. |
| 6,690,882 | B1 | 2/2004 | Hanmann et al. |
| 6,691,198 | B1 | 2/2004 | Hamlin |
| 6,691,213 | B1 | 2/2004 | Luu et al. |
| 6,691,255 | B1 | 2/2004 | Rothberg et al. |
| 6,693,760 | B1 | 2/2004 | Krounbi et al. |
| 6,694,477 | B1 | 2/2004 | Lee |
| 6,697,914 | B1 | 2/2004 | Hospodor et al. |
| 6,704,153 | B1 | 3/2004 | Rothberg et al. |
| 6,708,251 | B1 | 3/2004 | Boyle et al. |
| 6,710,951 | B1 | 3/2004 | Cloke |
| 6,711,628 | B1 | 3/2004 | Thelin |
| 6,711,635 | B1 | 3/2004 | Wang |
| 6,711,660 | B1 | 3/2004 | Milne et al. |
| 6,715,044 | B2 | 3/2004 | Lofgren et al. |
| 6,724,982 | B1 | 4/2004 | Hamlin |
| 6,725,329 | B1 | 4/2004 | Ng et al. |
| 6,735,650 | B1 | 5/2004 | Rothberg |
| 6,735,693 | B1 | 5/2004 | Hamlin |
| 6,744,772 | B1 | 6/2004 | Eneboe et al. |
| 6,745,283 | B1 | 6/2004 | Dang |
| 6,751,402 | B1 | 6/2004 | Elliott et al. |
| 6,757,481 | B1 | 6/2004 | Nazarian et al. |
| 6,772,274 | B1 | 8/2004 | Estakhri |
| 6,772,281 | B2 | 8/2004 | Hamlin |
| 6,781,826 | B1 | 8/2004 | Goldstone et al. |
| 6,782,449 | B1 | 8/2004 | Codilian et al. |
| 6,791,779 | B1 | 9/2004 | Singh et al. |
| 6,792,486 | B1 | 9/2004 | Hanan et al. |
| 6,799,274 | B1 | 9/2004 | Hamlin |
| 6,811,427 | B2 | 11/2004 | Garrett et al. |
| 6,826,003 | B1 | 11/2004 | Subrahmanyam |
| 6,826,614 | B1 | 11/2004 | Hanmann et al. |
| 6,829,688 | B2 | 12/2004 | Grubbs et al. |
| 6,832,041 | B1 | 12/2004 | Boyle |
| 6,832,929 | B2 | 12/2004 | Garrett et al. |
| 6,845,405 | B1 | 1/2005 | Thelin |
| 6,845,427 | B1 | 1/2005 | Atai-Azimi |
| 6,850,443 | B2 | 2/2005 | Lofgren et al. |
| 6,851,055 | B1 | 2/2005 | Boyle et al. |
| 6,851,063 | B1 | 2/2005 | Boyle et al. |
| 6,853,731 | B1 | 2/2005 | Boyle et al. |
| 6,854,022 | B1 | 2/2005 | Thelin |
| 6,862,660 | B1 | 3/2005 | Wilkins et al. |
| 6,880,043 | B1 | 4/2005 | Castro et al. |
| 6,882,486 | B1 | 4/2005 | Kupferman |
| 6,884,085 | B1 | 4/2005 | Goldstone |
| 6,886,068 | B2 | 4/2005 | Tomita |
| 6,888,831 | B1 | 5/2005 | Hospodor et al. |
| 6,892,217 | B1 | 5/2005 | Hanmann et al. |
| 6,892,249 | B1 | 5/2005 | Codilian et al. |
| 6,892,313 | B1 | 5/2005 | Codilian et al. |
| 6,895,455 | B1 | 5/2005 | Rothberg |
| 6,895,468 | B2 | 5/2005 | Rege et al. |
| 6,895,500 | B1 | 5/2005 | Rothberg |
| 6,898,730 | B1 | 5/2005 | Hanan |
| 6,901,479 | B2 | 5/2005 | Tomita |
| 6,910,099 | B1 | 6/2005 | Wang et al. |
| 6,920,455 | B1 | 7/2005 | Weschler |
| 6,928,470 | B1 | 8/2005 | Hamlin |
| 6,931,439 | B1 | 8/2005 | Hanmann et al. |
| 6,934,104 | B1 | 8/2005 | Kupferman |
| 6,934,713 | B2 | 8/2005 | Schwartz et al. |
| 6,940,873 | B2 | 9/2005 | Boyle et al. |
| 6,943,978 | B1 | 9/2005 | Lee |
| 6,948,165 | B1 | 9/2005 | Luu et al. |
| 6,950,267 | B1 | 9/2005 | Liu et al. |
| 6,954,733 | B1 | 10/2005 | Ellis et al. |
| 6,961,814 | B1 | 11/2005 | Thelin et al. |
| 6,965,489 | B1 | 11/2005 | Lee et al. |
| 6,965,563 | B1 | 11/2005 | Hospodor et al. |
| 6,965,966 | B1 | 11/2005 | Rothberg et al. |
| 6,967,799 | B1 | 11/2005 | Lee |
| 6,967,810 | B2 | 11/2005 | Kasiraj et al. |
| 6,968,422 | B1 | 11/2005 | Codilian et al. |
| 6,968,450 | B1 | 11/2005 | Rothberg et al. |
| 6,973,495 | B1 | 12/2005 | Milne et al. |
| 6,973,570 | B1 | 12/2005 | Hamlin |
| 6,976,190 | B1 | 12/2005 | Goldstone |
| 6,983,316 | B1 | 1/2006 | Milne et al. |
| 6,986,007 | B1 | 1/2006 | Procyk et al. |
| 6,986,154 | B1 | 1/2006 | Price et al. |
| 6,995,933 | B1 | 2/2006 | Codilian et al. |
| 6,996,501 | B1 | 2/2006 | Rothberg |
| 6,996,669 | B1 | 2/2006 | Dang et al. |
| 7,002,926 | B1 | 2/2006 | Eneboe et al. |
| 7,003,674 | B1 | 2/2006 | Hamlin |
| 7,006,316 | B1 | 2/2006 | Sargenti, Jr. et al. |

(56) References Cited

U.S. PATENT DOCUMENTS

| | | | |
|---|---|---|---|
| 7,009,820 | B1 | 3/2006 | Hogg |
| 7,023,639 | B1 | 4/2006 | Kupferman |
| 7,024,491 | B1 | 4/2006 | Hanmann et al. |
| 7,024,549 | B1 | 4/2006 | Luu et al. |
| 7,024,614 | B1 | 4/2006 | Thelin et al. |
| 7,027,716 | B1 | 4/2006 | Boyle et al. |
| 7,028,174 | B1 | 4/2006 | Atai-Azimi et al. |
| 7,031,902 | B1 | 4/2006 | Catiller |
| 7,043,140 | B2 * | 5/2006 | Ando et al. .......... 386/241 |
| 7,046,465 | B1 | 5/2006 | Kupferman |
| 7,046,488 | B1 | 5/2006 | Hogg |
| 7,050,252 | B1 | 5/2006 | Vallis |
| 7,054,937 | B1 | 5/2006 | Milne et al. |
| 7,055,000 | B1 | 5/2006 | Severtson |
| 7,055,167 | B1 | 5/2006 | Masters |
| 7,057,836 | B1 | 6/2006 | Kupferman |
| 7,062,398 | B1 | 6/2006 | Rothberg |
| 7,075,746 | B1 | 7/2006 | Kupferman |
| 7,076,604 | B1 | 7/2006 | Thelin |
| 7,082,494 | B1 | 7/2006 | Thelin et al. |
| 7,088,538 | B1 | 8/2006 | Codilian et al. |
| 7,088,545 | B1 | 8/2006 | Singh et al. |
| 7,092,186 | B1 | 8/2006 | Hogg |
| 7,095,577 | B1 | 8/2006 | Codilian et al. |
| 7,099,095 | B1 | 8/2006 | Subrahmanyam et al. |
| 7,106,537 | B1 | 9/2006 | Bennett |
| 7,106,947 | B2 | 9/2006 | Boyle et al. |
| 7,110,202 | B1 | 9/2006 | Vasquez |
| 7,111,116 | B1 | 9/2006 | Boyle et al. |
| 7,114,029 | B1 | 9/2006 | Thelin |
| 7,120,737 | B1 | 10/2006 | Thelin |
| 7,120,806 | B1 | 10/2006 | Codilian et al. |
| 7,126,776 | B1 | 10/2006 | Warren, Jr. et al. |
| 7,129,763 | B1 | 10/2006 | Bennett et al. |
| 7,133,600 | B1 | 11/2006 | Boyle |
| 7,136,244 | B1 | 11/2006 | Rothberg |
| 7,146,094 | B1 | 12/2006 | Boyle |
| 7,149,046 | B1 | 12/2006 | Coker et al. |
| 7,150,036 | B1 | 12/2006 | Milne et al. |
| 7,155,448 | B2 | 12/2006 | Winter |
| 7,155,616 | B1 | 12/2006 | Hamlin |
| 7,171,108 | B1 | 1/2007 | Masters et al. |
| 7,171,110 | B1 | 1/2007 | Wilshire |
| 7,194,576 | B1 | 3/2007 | Boyle |
| 7,200,698 | B1 | 4/2007 | Rothberg |
| 7,205,805 | B1 | 4/2007 | Bennett |
| 7,206,497 | B1 | 4/2007 | Boyle et al. |
| 7,215,496 | B1 | 5/2007 | Kupferman et al. |
| 7,215,771 | B1 | 5/2007 | Hamlin |
| 7,237,054 | B1 | 6/2007 | Cain et al. |
| 7,240,161 | B1 | 7/2007 | Boyle |
| 7,249,365 | B1 | 7/2007 | Price et al. |
| 7,263,709 | B1 | 8/2007 | Krapf |
| 7,274,639 | B1 | 9/2007 | Codilian et al. |
| 7,274,659 | B2 | 9/2007 | Hospodor |
| 7,275,116 | B1 | 9/2007 | Hanmann et al. |
| 7,280,302 | B1 | 10/2007 | Masiewicz |
| 7,292,774 | B1 | 11/2007 | Masters et al. |
| 7,292,775 | B1 | 11/2007 | Boyle et al. |
| 7,296,284 | B1 | 11/2007 | Price et al. |
| 7,302,501 | B1 | 11/2007 | Cain et al. |
| 7,302,579 | B1 | 11/2007 | Cain et al. |
| 7,318,088 | B1 | 1/2008 | Mann |
| 7,319,806 | B1 | 1/2008 | Willner et al. |
| 7,325,244 | B2 | 1/2008 | Boyle et al. |
| 7,330,323 | B1 | 2/2008 | Singh et al. |
| 7,346,790 | B1 | 3/2008 | Klein |
| 7,366,641 | B1 | 4/2008 | Masiewicz et al. |
| 7,369,340 | B1 | 5/2008 | Dang et al. |
| 7,369,343 | B1 | 5/2008 | Yeo et al. |
| 7,372,650 | B1 | 5/2008 | Kupferman |
| 7,380,147 | B1 | 5/2008 | Sun |
| 7,392,340 | B1 | 6/2008 | Dang et al. |
| 7,404,013 | B1 | 7/2008 | Masiewicz |
| 7,406,545 | B1 | 7/2008 | Rothberg et al. |
| 7,412,585 | B2 | 8/2008 | Uemura |
| 7,415,571 | B1 | 8/2008 | Hanan |
| 7,436,610 | B1 | 10/2008 | Thelin |
| 7,437,502 | B1 | 10/2008 | Coker |
| 7,440,214 | B1 | 10/2008 | Ell et al. |
| 7,451,344 | B1 | 11/2008 | Rothberg |
| 7,471,483 | B1 | 12/2008 | Ferris et al. |
| 7,471,486 | B1 | 12/2008 | Coker et al. |
| 7,486,060 | B1 | 2/2009 | Bennett |
| 7,486,460 | B2 | 2/2009 | Tsuchinaga et al. |
| 7,490,212 | B2 | 2/2009 | Kasiraj et al. |
| 7,496,493 | B1 | 2/2009 | Stevens |
| 7,509,471 | B2 | 3/2009 | Gorobets |
| 7,516,267 | B2 | 4/2009 | Coulson et al. |
| 7,518,819 | B1 | 4/2009 | Yu et al. |
| 7,526,184 | B1 | 4/2009 | Parkinen et al. |
| 7,529,880 | B2 | 5/2009 | Chung et al. |
| 7,539,924 | B1 | 5/2009 | Vasquez et al. |
| 7,543,117 | B1 | 6/2009 | Hanan |
| 7,551,383 | B1 | 6/2009 | Kupferman |
| 7,562,282 | B1 | 7/2009 | Rothberg |
| 7,577,973 | B1 | 8/2009 | Kapner, III et al. |
| 7,596,797 | B1 | 9/2009 | Kapner, III et al. |
| 7,599,139 | B1 | 10/2009 | Bombet et al. |
| 7,603,530 | B1 | 10/2009 | Liikanen et al. |
| 7,619,841 | B1 | 11/2009 | Kupferman |
| 7,647,544 | B1 | 1/2010 | Masiewicz |
| 7,649,704 | B1 | 1/2010 | Bombet et al. |
| 7,653,927 | B1 | 1/2010 | Kapner, III et al. |
| 7,656,603 | B1 | 2/2010 | Xing |
| 7,656,763 | B1 | 2/2010 | Jin et al. |
| 7,657,149 | B2 | 2/2010 | Boyle |
| 7,669,044 | B2 | 2/2010 | Fitzgerald et al. |
| 7,672,072 | B1 | 3/2010 | Boyle et al. |
| 7,673,075 | B1 | 3/2010 | Masiewicz |
| 7,685,360 | B1 | 3/2010 | Brunnett et al. |
| 7,688,540 | B1 | 3/2010 | Mei et al. |
| 7,724,461 | B1 | 5/2010 | McFadyen et al. |
| 7,725,584 | B1 | 5/2010 | Hanmann et al. |
| 7,730,295 | B1 | 6/2010 | Lee |
| 7,760,458 | B1 | 7/2010 | Trinh |
| 7,768,776 | B1 | 8/2010 | Szeremeta et al. |
| 7,804,657 | B1 | 9/2010 | Hogg et al. |
| 7,813,954 | B1 | 10/2010 | Price et al. |
| 7,827,320 | B1 | 11/2010 | Stevens |
| 7,839,588 | B1 | 11/2010 | Dang et al. |
| 7,840,878 | B1 | 11/2010 | Tang et al. |
| 7,843,660 | B1 | 11/2010 | Yeo |
| 7,852,596 | B2 | 12/2010 | Boyle et al. |
| 7,859,782 | B1 | 12/2010 | Lee |
| 7,872,822 | B1 | 1/2011 | Rothberg |
| 7,898,756 | B1 | 3/2011 | Wang |
| 7,898,762 | B1 | 3/2011 | Guo et al. |
| 7,900,037 | B1 | 3/2011 | Fallone et al. |
| 7,907,364 | B2 | 3/2011 | Boyle et al. |
| 7,929,234 | B1 | 4/2011 | Boyle et al. |
| 7,933,087 | B1 | 4/2011 | Tsai et al. |
| 7,933,090 | B1 | 4/2011 | Jung et al. |
| 7,934,030 | B1 | 4/2011 | Sargenti, Jr. et al. |
| 7,940,491 | B2 | 5/2011 | Szeremeta et al. |
| 7,944,639 | B1 | 5/2011 | Wang |
| 7,945,727 | B2 | 5/2011 | Rothberg et al. |
| 7,949,564 | B1 | 5/2011 | Hughes et al. |
| 7,974,029 | B2 | 7/2011 | Tsai et al. |
| 7,974,039 | B1 | 7/2011 | Xu et al. |
| 7,982,993 | B1 | 7/2011 | Tsai et al. |
| 7,984,200 | B1 | 7/2011 | Bombet et al. |
| 7,990,648 | B1 | 8/2011 | Wang |
| 7,992,179 | B1 | 8/2011 | Kapner, III et al. |
| 8,004,785 | B1 | 8/2011 | Tsai et al. |
| 8,006,027 | B1 | 8/2011 | Stevens et al. |
| 8,014,094 | B1 | 9/2011 | Jin |
| 8,014,977 | B1 | 9/2011 | Masiewicz et al. |
| 8,019,914 | B1 | 9/2011 | Vasquez et al. |
| 8,040,625 | B1 | 10/2011 | Boyle et al. |
| 8,078,943 | B1 | 12/2011 | Lee |
| 8,079,045 | B2 | 12/2011 | Krapf et al. |
| 8,082,433 | B1 | 12/2011 | Fallone et al. |
| 8,085,487 | B1 | 12/2011 | Jung et al. |

(56) References Cited

U.S. PATENT DOCUMENTS

| | | |
|---|---|---|
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,443,167 B1 | 5/2013 | Fallone et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,631,197 B2 | 1/2014 | Hall |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Pruett et al. |
| 8,756,382 B1 | 6/2014 | Carlson et al. |
| 8,769,593 B1 | 7/2014 | Elliott et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,429 B1 | 7/2014 | Call et al. |
| 8,793,532 B1 | 7/2014 | Tsai et al. |
| 8,797,669 B1 | 8/2014 | Burton et al. |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 8,856,438 B1 | 10/2014 | Warner et al. |
| 2004/0019718 A1 | 1/2004 | Schauer et al. |
| 2004/0109376 A1 | 6/2004 | Lin |
| 2005/0071537 A1 | 3/2005 | New et al. |
| 2005/0144517 A1 | 6/2005 | Zayas |
| 2006/0090030 A1 | 4/2006 | Ijdens et al. |
| 2006/0112138 A1 | 5/2006 | Fenske et al. |
| 2006/0117161 A1 | 6/2006 | Venturi |
| 2006/0181993 A1 | 8/2006 | Blacquiere et al. |
| 2007/0016721 A1 | 1/2007 | Gay |
| 2007/0067603 A1 | 3/2007 | Yamamoto et al. |
| 2007/0204100 A1 | 8/2007 | Shin et al. |
| 2007/0226394 A1 | 9/2007 | Noble |
| 2007/0245064 A1 | 10/2007 | Liu |
| 2007/0288686 A1 | 12/2007 | Arcedera et al. |
| 2007/0294589 A1 | 12/2007 | Jarvis et al. |
| 2008/0098195 A1 | 4/2008 | Cheon et al. |
| 2008/0104308 A1 | 5/2008 | Mo et al. |
| 2008/0183955 A1 | 7/2008 | Yang et al. |
| 2008/0195801 A1 | 8/2008 | Cheon et al. |
| 2008/0256287 A1 | 10/2008 | Lee et al. |
| 2008/0256295 A1 | 10/2008 | Lambert et al. |
| 2008/0270680 A1 | 10/2008 | Chang |
| 2008/0307192 A1 | 12/2008 | Sinclair et al. |
| 2009/0019218 A1 | 1/2009 | Sinclair et al. |
| 2009/0043985 A1 | 2/2009 | Tuuk et al. |
| 2009/0055620 A1 | 2/2009 | Feldman et al. |

(56) References Cited

U.S. PATENT DOCUMENTS

| | | |
|---|---|---|
| 2009/0063548 A1 | 3/2009 | Rusher et al. |
| 2009/0113702 A1 | 5/2009 | Hogg |
| 2009/0119353 A1 | 5/2009 | Oh et al. |
| 2009/0150599 A1 | 6/2009 | Bennett |
| 2009/0154254 A1 | 6/2009 | Wong et al. |
| 2009/0164535 A1 | 6/2009 | Gandhi et al. |
| 2009/0164696 A1 | 6/2009 | Allen et al. |
| 2009/0187732 A1 | 7/2009 | Greiner et al. |
| 2009/0193184 A1 | 7/2009 | Yu et al. |
| 2009/0198952 A1 | 8/2009 | Khmelnitsky et al. |
| 2009/0204750 A1 | 8/2009 | Estakhri et al. |
| 2009/0222643 A1 | 9/2009 | Chu |
| 2009/0240873 A1 | 9/2009 | Yu et al. |
| 2009/0276604 A1 | 11/2009 | Baird et al. |
| 2010/0011275 A1 | 1/2010 | Yang |
| 2010/0061150 A1 | 3/2010 | Wu et al. |
| 2010/0161881 A1 | 6/2010 | Nagadomi et al. |
| 2010/0169543 A1 | 7/2010 | Edgington et al. |
| 2010/0169551 A1 | 7/2010 | Yano et al. |
| 2010/0208385 A1 | 8/2010 | Toukairin |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |

OTHER PUBLICATIONS

Robert M. Fallone, et al., U.S. Appl. No. 13/027,432, filed Feb. 15, 2011, 22 pages.

Rosenblum, "The Design and Implementation of a Log-structured File System", EECS Department, University of California, Berkeley, Technical Report No. UCB/CSD-92-696, Jun. 1992.

Mendel Rosenblum, John K. Ousterhout, "The Design and Implementation of a Log-Structured File System", University of California, ACM Transactions on Computer Systems, Feb. 1992, pp. 26-52, vol. 10, No. 1, Berkeley, California.

Amer, et al., "Design Issues for a Shingled Write Disk System", 26th IEEE Symposium on Massive Storage Systems and Technologies: Research Track (MSST 2010), May 2010, 12 pages.

\* cited by examiner

| Sequence Identifier | Object ID | Block Address |
|---|---|---|
| 0 | A | 5 |
| 0 | B | 6 |
| 0 | C | 7 |
| 0 | D | 8 |
| 0 | E | 9 |
| 0 | F | 10 |
| 0 | G | 11 |
| 0 | H | 12 |
| 0 | I | 13 |

| Sequence identifier | Object ID | Block Address |
|---|---|---|
| 1 | A | 17 |
| 1 | B | 16 |
| 1 | C | 1 |
| 1 | D | 0 |
| 1 | E | 15 |
| 1 | F | 18 |
| 1 | G | 14 |
| 0 | H | 12 |
| 0 | I | 13 |

MANAGEMENT OF DATA OBJECTS IN A DATA OBJECT ZONE

BACKGROUND

Data Storage Devices (DSDs) are often used to record data onto or to reproduce data from a storage media. One type of storage media includes a rotating magnetic disk where a magnetic head of the DSD can read and write data in tracks on a surface of the disk.

A DSD may periodically perform garbage collection or defragmentation processes in order to make better use of space on the disk. In the case of garbage collection, the DSD attempts to free up space that is taken up by obsolete or invalid data. In the case of defragmentation, the DSD attempts to reorganize the locations of data on the disk to provide a more contiguous block of data.

Data objects that are frequently updated can create more obsolete or invalid data and greater discontinuities in where current versions of data (i.e., valid data) are stored. Garbage collection and defragmentation may therefore be performed more frequently for portions of the disk storing frequently updated data objects. Depending on the extent of garbage collection or defragmentation, such maintenance operations can consume significant resources of the DSD in terms of available memory and processing when copying and relocating large amounts of data on the disk.

Garbage collection and defragmentation can become particularly burdensome for portions of the disk utilizing Shingled Magnetic Recording (SMR). SMR has recently been introduced as a way of increasing the amount of data that can be stored in a given area on the disk by increasing the number of Tracks Per Inch (TPI) by overlapping tracks on the disk to result in narrow tracks at the non-overlapping portion of the tracks. Although SMR generally increases the recording density of the disk, SMR typically requires that the tracks are sequentially written since a new write to a previously overlapped track would also affect data in an adjacent track. SMR portions of a disk are therefore usually garbage collected or defragmented in their entirety. However, as noted above, frequently updated data objects can create a need for more garbage collection and defragmentation which can require additional resources for an SMR portion of the disk.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
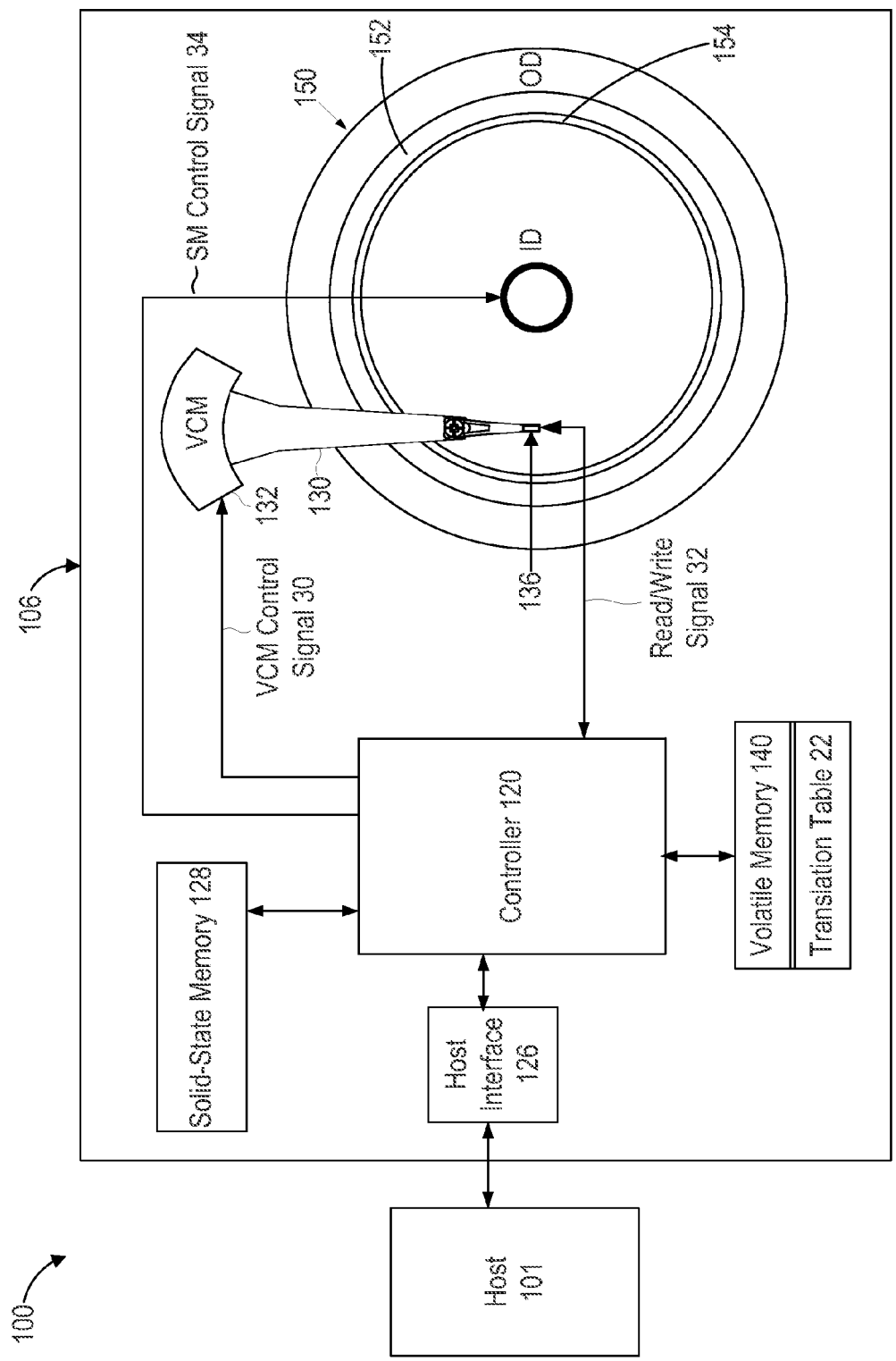
FIG. 1 is a block diagram depicting a Data Storage Device (DSD) according to an embodiment.

FIG. 1 shows system 100 according to an embodiment which includes host 101 and Data Storage Device (DSD) 106. System 100 can be, for example, a computer system (e.g., server, desktop, mobile/laptop, tablet, smartphone, etc.) or other electronic device such as a digital video recorder (DVR). In this regard, system 100 may be a stand-alone system or part of a network. Those of ordinary skill in the art will appreciate that system 100 and DSD 106 can include more or less than those elements shown in FIG. 1 and that the disclosed processes can be implemented in other environments.

In the example embodiment of FIG. 1, DSD 106 includes both solid-state memory 128 and disk 150 for storing data. In this regard, DSD 106 can be considered a Solid-state Hybrid Drive (SSHD) in that it includes both solid-state Non-Volatile Memory (NVM) media and disk NVM media. In other embodiments, each of disk 150 or solid-state memory 128 may be replaced by multiple Hard Disk Drives (HDDs) or multiple Solid-State Drives (SSDs), respectively, so that DSD 106 includes pools of HDDs or SSDs. In yet other embodiments, the NVM media of DSD 106 may only include disk 150 without solid-state memory 128.

DSD 106 includes controller 120 which comprises circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, controller 120 can include a System on a Chip (SoC).

Host interface 126 is configured to interface DSD 106 with host 101 and may interface according to a standard such as, for example, PCI express (PCIe), Serial Advanced Technology Attachment (SATA), or Serial Attached SCSI (SAS). As will be appreciated by those of ordinary skill in the art, host interface 126 can be included as part of controller 120.

In the example of FIG. 1, disk 150 is rotated by a spindle motor (not shown). DSD 106 also includes head 136 connected to the distal end of actuator 130 which is rotated by Voice Coil Motor (VCM) 132 to position head 136 in relation to disk 150. Controller 120 can control the position of head 136 and the rotation of disk 150 using VCM control signal 30 and SM control signal 34, respectively.

As appreciated by those of ordinary skill in the art, disk 150 may form part of a disk pack with additional disks radially aligned below disk 150. In addition, head 136 may form part of a head stack assembly including additional heads with each head arranged to read data from and write data to a corresponding surface of a disk in a disk pack.

Disk 150 includes a number of radial spaced, concentric tracks (not shown) for storing data on a surface of disk 150 from an Inside Diameter (ID) portion to an Outside Diameter (OD) portion of disk 150. The tracks on disk 150 may be grouped together into zones of tracks with each track divided into a number of sectors that are spaced circumferentially along the tracks.

As shown in FIG. 1, disk 150 also includes data object zone 152 and root area 154. As discussed below in more detail, data object zone 152 can be used to store data objects that may be frequently updated. Root area 154 stores mapping data identifying locations of the data objects stored in data object zone 152. In other embodiments, the location of data object zone 152 and root area 154 may differ from the locations shown in FIG. 1. For example, data object zone 152 and root area may be stored more towards an OD or ID portion of disk 150.

In the embodiment of FIG. 1, root area 154 and data object zone 152 are depicted in close proximity to each other on disk 150. This can allow for quicker updating of root area 154 or quicker access of data objects in data object zone 152 since head 136 has less distance to travel between root area 154 and data object zone 152. In other embodiments, root area 154 and data object zone 152 may not be in close proximity to each other on disk 150. For example, in an embodiment where disk 150 is part of a disk pack, root area 154 and data object zone 152 may be on different disk surfaces accessed by different heads 136. In another embodiment, root area 154 may be located in solid-state memory 128.

In some embodiments, disk 150 or portions of disk 150 can include Shingled Magnetic Recording (SMR) where tracks overlap to increase a number of Tracks Per Inch (TPI) or recording density of disk 150. As noted above, SMR typically requires that the tracks are sequentially written since a new write to a previously overlapped track would also affect data in an adjacent track. In order to allow for the storage of frequently updated objects in an SMR portion of disk 150, data object zone 152 may be used as a circular buffer where certain data objects are rewritten within data object zone 152 to attempt to keep the most recent versions of data objects in a contiguous portion of data object zone 152. Such management of data object zone 152 ordinarily decreases or eliminates the need for large scale garbage collection or defragmentation of data object zone 152, which can consume significant resources of DSD 106 (e.g., controller 120 and volatile memory 140). This is especially true if data object zone 152 includes SMR where all of data object zone 152 may need to be sequentially rewritten.

In addition to disk 150, the NVM media of DSD 106 also includes solid-state memory 128 for storing data. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., Single-Level Cell (SLC) memory, Multi-Level Cell (MLC) memory, or any combination thereof), NOR memory, EEPROM, Ferroelectric Memory (FeRAM), Magnetoresistive RAM (MRAM), other discrete NVM chips, or any combination thereof.

Volatile memory 140 can include, for example, a Dynamic Random Access Memory (DRAM) which can be used by DSD 106 to temporarily store data. Data stored in volatile memory 140 can include data read from NVM media (e.g., disk 150 or solid-state memory 128), data to be written to NVM media, instructions loaded from firmware of DSD 106 for execution by controller 120, or data used in executing firmware of DSD 106.

As shown in the embodiment of FIG. 1, volatile memory 140 stores translation table 22, which provides a mapping between Logical Block Addresses (LBAs) used by host 101 and physical locations (e.g., Physical Block Addresses (PBAs)) indicating physical locations on disk 150 or in solid-state memory 128. In one embodiment, a back-up copy of translation table 22 or a portion of translation table 22 is stored in data object zone 152. The data object zone 152 is updated to account for changes to translation table 22 stored in volatile memory 140. In other embodiments, data object zone 152 may store other data objects in addition to or without translation table 22.

In operation, host interface 126 receives read and write commands from host 101 via host interface 126 for reading data from and writing data to the NVM media of DSD 106. In response to a write command from host 101, controller 120 may buffer the data to be written for the write command in volatile memory 140.

For data to be stored in solid-state memory 128, controller 120 receives data from host interface 126 and may buffer the data in volatile memory 140. In one implementation, the data is then encoded into charge values for charging cells (not shown) of solid-state memory 128 to store the data.

In response to a read command for data stored in solid-state memory 128, controller 120 in one implementation reads current values for cells in solid-state memory 128 and decodes the current values into data that can be transferred to host 101. Such data may be buffered by controller 120 before transferring the data to host 101 via host interface 126.

For data to be written to disk 150, controller 120 can encode the buffered data into write signal 32 which is provided to head 136 for magnetically writing data to the surface of disk 150.

In response to a read command for data stored on disk 150, controller 120 positions head 136 via VCM control signal 30 to magnetically read the data stored on the surface of disk 150. Head 136 sends the read data as read signal 32 to controller 120 for decoding, and the data is buffered in volatile memory 140 for transferring to host 101.

Data Object Zone Example

Figure 2A:
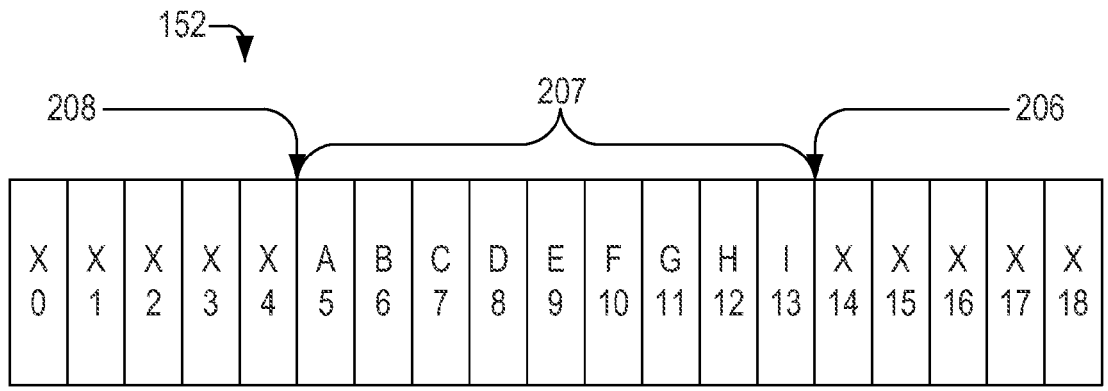
FIG. 2A illustrates an example of an initial arrangement of data objects in a data object zone according to an embodiment.

FIG. 2A illustrates an example of an initial arrangement of data objects in data object zone 152 according to an embodiment. As shown in FIG. 2A, data objects A to I are stored in contiguous block 207 of most recent data objects. Contiguous block 207 begins at head 208 with data object A at block 5 and extends to tail 206 with data object I at block 13. Free space outside of contiguous block 207 is indicated with X's in blocks 0 to 4 and in blocks 14 to 17. The free space in data object zone 152 can include previous versions of data objects A to I or empty blocks without data. In other embodiments, the number of blocks and data objects stored in data object zone 152 may differ.

In the embodiment of FIG. 2A, controller 120 is configured to use data object zone 152 as a circular buffer for storing the most recent versions of data objects A to I from volatile memory 140. Writing in data object zone 152 can begin at one block in data object zone 152 and continue until the end of data object zone 152 is reached before resuming at the beginning of data object zone 152.

Data objects A to I can include data that is stored in volatile memory 140 that is changed during the operation of DSD 106. One example of such data, can include translation table 22 or portions of translation table 22. In this example, translation table 22 may be updated with new physical addresses associated with logical addresses when data is rewritten on disk 150 or solid state-memory 128. Translation table 22 is updated in volatile memory 140 and an updated copy of translation table 22 may later be stored in data object zone 152 to provide locations of data upon a startup of DSD 106.

In the example of FIG. 2A, data object zone 152 is sized so as to allow enough space to store a previous version of data objects A to I in addition to the most recent version of data objects A to I. In other words, the size of data object zone 152 is at least twice the size needed to store data objects A to I. Data object zone 152 may also include additional space for overprovisioning or for providing boundary buffers between data object zone 152 and zones outside of data object zone 152 on disk 150.

In addition, each of the blocks in data object zone 152 can be the same size so as to facilitate the relocation of data from one of blocks 0 to 18 to any of the other blocks in data object zone 152. Controller 120 may pad data or increase a size of data to be stored in data object zone 152 in order to meet a modular size for each of blocks 0 to 18.

Figure 2B:
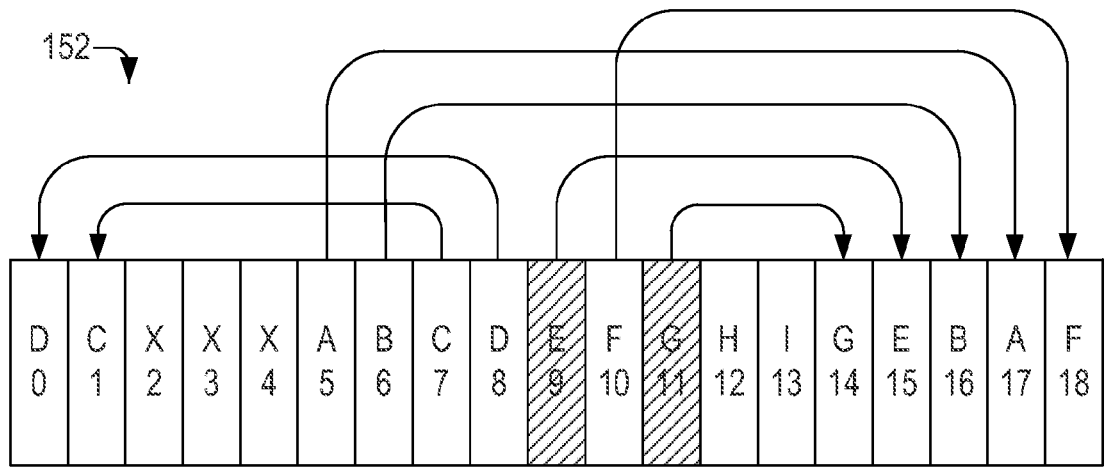
FIG. 2B illustrates an example of the data object zone of FIG. 2A after writing a most recent version of two data objects according to an embodiment.

FIG. 2B illustrates an example of data object zone 152 after writing a most recent version of data objects E and G according to an embodiment. As shown in FIG. 2B, new versions of data objects E and G are written at tail 206 in blocks 15 and 14, respectively. Data objects A, B, C, D, and F are rewritten in blocks 17, 16, 1, 0, and 18, respectively, so that the earlier versions of obsolete data objects E and G stored in blocks 9 and 11 do not interrupt a contiguous plurality of most recent versions of data objects. Although FIG. 2B depicts one example order for relocating the most recent versions of data objects A to D and F, the particular locations or particular order of data objects can vary.

Figure 2C:
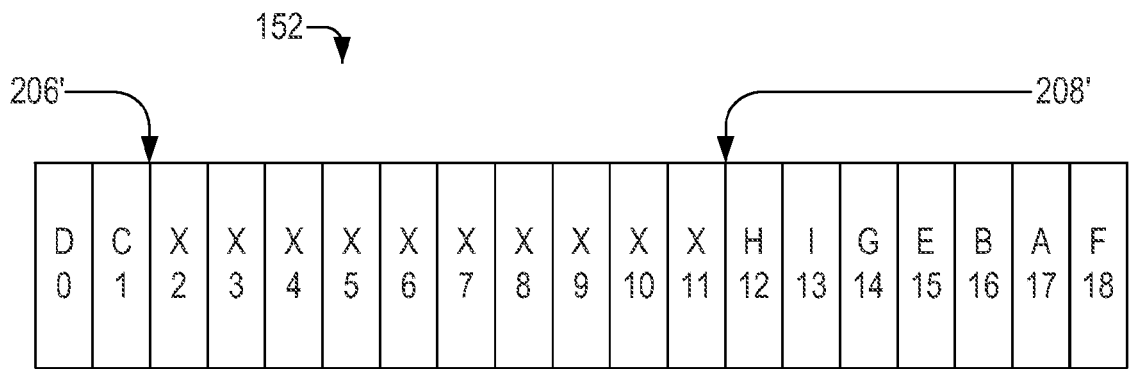
FIG. 2C illustrates an example of rewriting at least one most recent version of a previously written data object in the data object zone of FIG. 2B according to an embodiment.

FIG. 2C illustrates data object zone 152 after rewriting the most recent versions of data objects A, B, C, D, and F according to an embodiment. As shown in FIG. 2C, head 208' is located before block 12 and tail 206' is located after block 1. Since data object zone 152 serves as a circular buffer for storing the most recent versions of data objects A to I, data object zone 152 now includes two contiguous pluralities of most recent data objects with the most recent versions wrapping from one end of data object zone 152 to the other end. In this regard, one contiguous plurality extends from block 12 to block 18, and a second contiguous plurality extends from block 0 to block 1.

To keep track of the new locations for data objects A to G, controller 120 can update mapping data in root area 154 to identify the new locations for data objects A to G. As noted above, root area 154 can be located on disk 150 as in the embodiment of FIG. 1, or root area 154 may be located in a different storage media such as solid-state memory 128.

Figures 3, 4A, 4B:
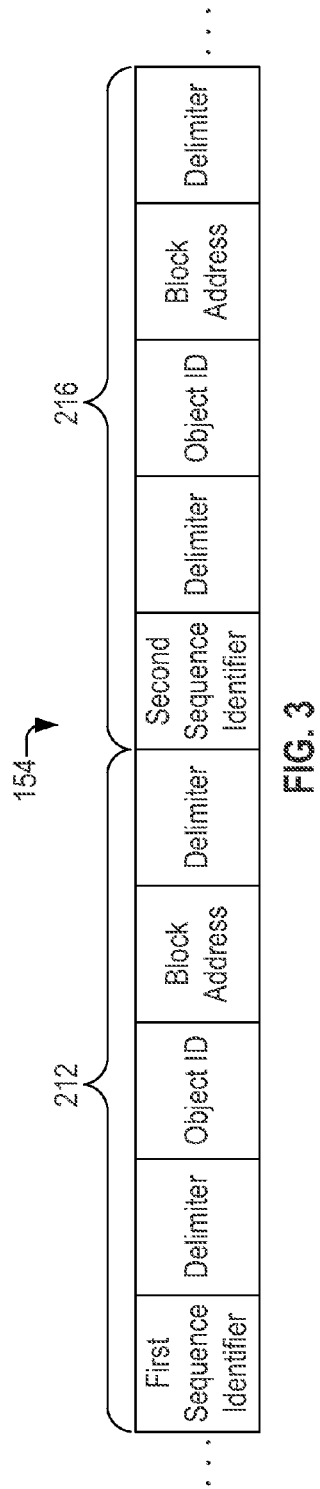
FIG. 3 depicts contents of a root area according to an embodiment.
FIG. 4A depicts mapping data corresponding to the data object zone of FIG. 2A according to an embodiment.
FIG. 4B depicts mapping data corresponding to the data object zone of FIG. 2C according to an embodiment.

FIG. 3 depicts example contents of root area 154 according to an embodiment. As shown in FIG. 3, root area 154 includes mapping data 212 and mapping data 216 to identify locations for corresponding data objects in data object zone 152.

Included within each of mapping data 212 and 216 are a sequence identifier, delimiters, an object ID, and a block address. The sequence identifiers can indicate how recently the corresponding data object was written in data object zone 152. This can include information related to an order that the data object was written in data object zone 152 that can be used to determine that the corresponding data object was written before or after other data objects or to signify a version or revision of the data object. Sequence identifiers may include, for example, a revision number, a sequence string, a sequence number, a time stamp, or a validation code. A further description of sequence identifiers can be found in U.S. patent application Ser. No. 13/027,432, filed on Feb. 15, 2011, which is hereby incorporated by reference in its entirety.

The delimiters can identify a beginning of mapping data for the corresponding data object. In one example, the delimiters may include a specific value of character that is used to denote the beginning or end of the mapping data. As with the sequence identifiers, the delimiters may be used when searching root area 154 for mapping data pertaining to a particular data object.

The object IDs provide an indication of a particular data object. This can include a logical address or addresses (e.g., LBAs), or another identifier for a data object. In the example of FIGS. 2A to 2C, object IDs of A to I were used for the data objects.

The block addresses provide location information for the corresponding data object in data object zone 152. The block addresses may include, for example, PBAs identifying particular sectors in data object zone 152.

As will be appreciated by those of ordinary skill in the art, other arrangements than those shown in FIG. 3 are possible for the mapping data or root area 154.

The mapping data of root area 154 can be used by controller 120 to locate different versions of a particular data objects. In an implementation of data object zone 152 where data object zone 152 is large enough to store a previous version of each data object in addition to the most recent version, controller 120 may sort through the sequence identifiers and object IDs of root area 154 to locate mapping data for either a previous version or a current version of a particular data object. A previous version of a data object may be retained for redundancy, for example, in the case of corrupted data in data object zone 152. The most recent or current version of a data object stored in data object zone 152 can be used, for example, to restore or rebuild the data object in volatile memory 140 when DSD 106 starts up after being powered off.

FIG. 4A depicts an initial state of mapping data corresponding to the data object zone 152 depicted in FIG. 2A according to an embodiment. The mapping data shown in FIG. 4A can be a portion of the mapping data written in root area 154. As shown in FIG. 4A, the sequence identifiers are all set to 0 indicating a first version of data objects A to I. The block addresses for each of the data object IDs correspond to the locations of the respective data objects in FIG. 2A.

In FIG. 4B, the block addresses of FIG. 4A have been updated after writing the new versions of data objects E and G, and rewriting or relocating the most recent versions of data objects A, B, C, D, and F according to an embodiment. As shown in FIG. 4B, the block addresses for these data objects now correspond to the arrangement shown in FIG. 2C. In addition, the sequence identifiers for each of data objects A to G have been incremented to indicate a new or most recently written version of the data object. Since the block addresses for data objects H and I remain unchanged at blocks 12 and 13, the sequence identifiers for these data objects remain set as 0.

Figure 5:
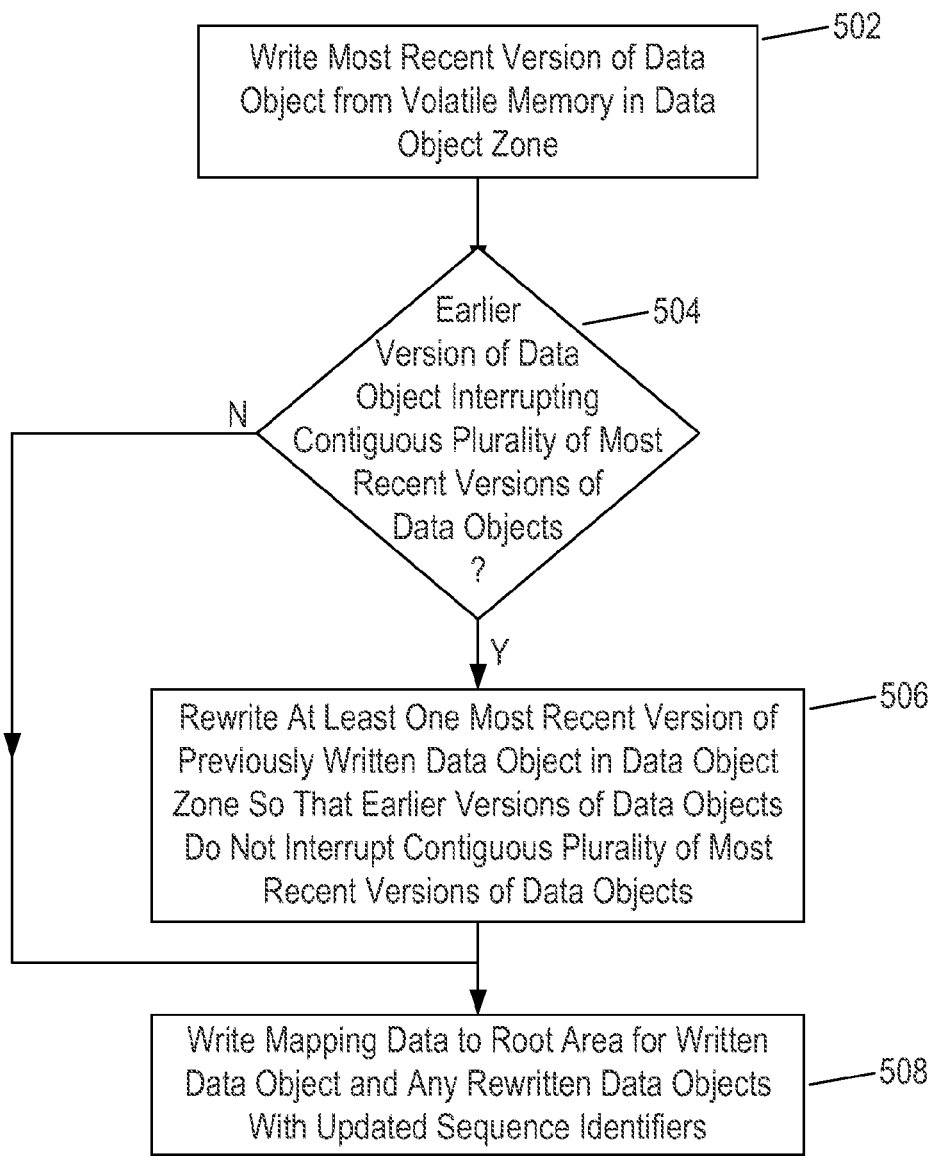
FIG. 5 is a flowchart for a data object management process according to an embodiment.

FIG. 5 is a flowchart for a data object management process according to an embodiment. The process of FIG. 5 can be performed, for example, by controller 120 executing a firmware of DSD 106 or computer-executable instructions stored in volatile memory 140.

In block 502, controller 120 controls head 136 to write a most recent version of a data object from volatile memory 140 in data object zone 152. This might result from a change to the data object or from a new data object being written. In one implementation, the data object includes translation table 22 or portions of translation table 22 such that updates or changes made to translation table 22 in volatile memory 140 result in updates to data object zone 152.

In block 504, data object zone 152 is checked to determine whether an earlier or obsolete version of a data object interrupts a contiguous plurality of most recent versions of data objects. In one implementation, mapping data such as sequence identifiers can be checked in block 504 to determine whether an earlier version of a data object interrupts a contiguous plurality of most recent versions of data objects.

The earlier or obsolete version may have resulted from writing a more recent version of the data object in block 502. As discussed above, a contiguous plurality of most recent versions of data objects may be located in any part of data object zone 152 since data object zone 152 is treated as a circular buffer. In this regard, there may be two contiguous pluralities of most recent versions, one extending from the beginning of data object zone 152 and a second extending toward the end of data object zone 152, as shown in FIG. 2C discussed above.

If it is determined that an earlier or obsolete version of a data object interrupts a contiguous plurality of most recent versions of data objects (e.g., data objects E and G in FIG. 2B), controller 120 in block 506 rewrites at least one most recent version of a previously written data object so that earlier versions of data objects do not interrupt a new contiguous plurality of most recent versions. In other words, the rewritten data object or data objects are rewritten so as to form part of a new contiguous plurality of most recent versions as in the example of FIG. 2B. As discussed above, rewriting at least one of the most recent versions to maintain a contiguous plurality of most recent versions ordinarily reduces the need for performing maintenance operations such as garbage collection or defragmentation in data object zone 152.

If it is determined that no earlier or obsolete versions of data objects interrupt a contiguous plurality of most recent versions of data objects, the process proceeds to block 508 to write mapping data to root area 154 for the data object written in block 502 and for any rewritten data objects. Sequence identifiers, such as those shown in FIG. 4B, may also be updated to indicate whether a data object is the most recent version. By keeping track of mapping data with the use of sequence identifiers, it is ordinarily possible to quickly access the most recent versions of data objects in data object zone 152 and maintain a contiguous plurality of most recent versions. In addition, the mapping data in root area 154 can also provide access to an earlier version of a data object for recovery purposes.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Data Storage Device (DSD), comprising:
   a disk for storing data, the disk including a data object zone for storing data objects;
   a volatile memory for storing data;
   a head for writing data on the disk; and
   a controller configured to:
      control the head to write a most recent version of a data object from the volatile memory onto the disk in the data object zone; and
      control the head to rewrite at least one most recent version of a previously written data object in the data object zone so that an earlier version of the data object written from the volatile memory does not interrupt a contiguous plurality of most recent versions of data objects stored in the data object zone.

2. The DSD of claim 1, wherein the controller is further configured to use the data object zone as a circular buffer for storing a most recent set of data objects including the contiguous plurality of most recent versions of data objects.

3. The DSD of claim 1, wherein the data object zone includes overlapping tracks for storing data objects.

4. The DSD of claim 1, wherein the data object written from the volatile memory includes at least a portion of a translation table associating logical block addresses for data stored in the DSD with physical block addresses identifying locations where the data is stored in the DSD.

5. The DSD of claim 1, wherein the disk further includes a root area for storing mapping data identifying locations of data objects stored in the data object zone.

6. The DSD of claim 5, wherein the controller is further configured to use the root area as a circular buffer for storing a most recent set of mapping data identifying locations of data objects stored in the data object zone.

7. The DSD of claim 5, wherein the controller is further configured to control the head to write mapping data in the root area for the data object written from the volatile memory and for the at least one rewritten data object.

8. The DSD of claim 5, wherein the mapping data includes a delimiter to identify a beginning of mapping data for the data object written in the data object zone.

9. The DSD of claim 5, wherein the mapping data includes a sequence identifier indicating how recently the data object was written in the data object zone.

10. The DSD of claim 9, wherein the controller is further configured to update the sequence identifier when a newer version of the data object is written in the data object zone.

11. The DSD of claim 9, wherein the controller is further configured to use the sequence identifier to identify a most recent version of the data object written in the data object zone.

12. The DSD of claim 1, wherein the controller is further configured to increase a written size of the data object when controlling the head to write the data object in the data object zone so that the data object fills a particular data storage capacity in the data object zone.

13. The DSD of claim 1, wherein a size of the data object zone is large enough to store a previous version of each data object of the plurality of data objects.

14. A method for managing data objects in a Data Storage Device (DSD) including a disk and a volatile memory for storing data, the method comprising:
   writing a data object from the volatile memory in a data object zone of the disk of the DSD; and
   rewriting at least one most recent version of a previously written data object in the data object zone so that an earlier version of the data object written from the volatile memory does not interrupt a contiguous plurality of most recent versions of data objects stored in the data object zone.

15. The method of claim 14, wherein the data object zone is used as a circular buffer for storing a most recent set of data objects including the contiguous plurality of most recent versions of data objects.

16. The method of claim 14, wherein the data object zone includes overlapping tracks for storing data objects.

17. The method of claim 14, wherein the data object written from the volatile memory includes at least a portion of a translation table associating logical block addresses for data stored in the DSD with physical block addresses identifying locations where the data is stored in the DSD.

18. The method of claim 14, wherein the disk further includes a root area for storing mapping data identifying locations of data objects stored in the data object zone.

19. The method of claim 18, further comprising using the root area as a circular buffer for storing a most recent set of mapping data identifying locations of data objects stored in the data object zone.

20. The method of claim 18, further comprising writing mapping data in the root area for the data object written from the volatile memory and for the at least one rewritten data object.

21. The method of claim 18, wherein the mapping data includes a delimiter to identify a beginning of mapping data for the data object written in the data object zone.

22. The method of claim 18, wherein the mapping data includes a sequence identifier indicating how recently the data object was written in the data object zone.

23. The method of claim 22, further comprising updating the sequence identifier when a newer version of the data object is written in the data object zone.

24. The method of claim 22, further comprising identifying a most recent version of the data object written in the data object zone using the sequence identifier.

25. The method of claim 14, further comprising increasing a written size of the data object when writing the data object in the data object zone so that the data object fills a particular data storage capacity in the data object zone.

26. The method of claim 14, wherein a size of the data object zone is large enough to store a previous version of each data object of the plurality of data objects.

* * * * *